US012384164B2

(12) United States Patent
Takeda et al.

(10) Patent No.: US 12,384,164 B2
(45) Date of Patent: Aug. 12, 2025

(54) LIQUID DISCHARGE APPARATUS HAVING LIQUID CONTAINER AND OPERATING MEMBER

(71) Applicant: CANON KABUSHIKI KAISHA, Tokyo (JP)

(72) Inventors: Daiju Takeda, Kanagawa (JP); Yuri Mori, Tokyo (JP); Tsuyoshi Saeki, Kanagawa (JP); Hideaki Matsumura, Tokyo (JP); Hiromasa Tsutsumi, Kanagawa (JP); Shota Asada, Tokyo (JP); Koki Shimada, Kanagawa (JP); Ken Takenaga, Kanagawa (JP); Mineyoshi Tomie, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 249 days.

(21) Appl. No.: 18/178,268

(22) Filed: Mar. 3, 2023

(65) Prior Publication Data

US 2023/0286282 A1 Sep. 14, 2023

(30) Foreign Application Priority Data

Mar. 8, 2022 (JP) ................................ 2022-035638

(51) Int. Cl.
*B41J 2/175* (2006.01)

(52) U.S. Cl.
CPC ................................ *B41J 2/17536* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/17536; B41J 2/1754; B41J 2/17553; B41J 29/13
See application file for complete search history.

(56) References Cited

U.S. PATENT DOCUMENTS

| | | | | |
|---|---|---|---|---|
| 11,097,547 | B2 * | 8/2021 | Shimada | B41J 2/17553 |
| 2017/0355197 | A1 * | 12/2017 | Kudo | B41J 2/17523 |

FOREIGN PATENT DOCUMENTS

| | | |
|---|---|---|
| JP | 2018069705 A | 5/2018 |

* cited by examiner

*Primary Examiner* — Anh T Vo
(74) *Attorney, Agent, or Firm* — Canon U.S.A., Inc. IP Divsion

(57) ABSTRACT

A liquid discharge apparatus includes a liquid container and an operating member. The liquid container is configured to introduce liquid from a liquid introducing portion to an inside. The operating member is configured to rotate around a rotation shaft in a first direction from a first position for covering the liquid introducing portion to move to a second position for exposing the liquid introducing portion, and rotate in a second direction opposite to the first direction from the second position to move to the first position. The operating member includes a plug member and a covering portion. The plug member is retained to the operating member by a retaining member and configured to plug the liquid introducing portion at the first position. The covering portion is configured to cover the plug member in a direction intersecting with the first direction.

11 Claims, 14 Drawing Sheets

LIQUID DISCHARGE APPARATUS HAVING LIQUID CONTAINER AND OPERATING MEMBER

BACKGROUND

Technical Field

One disclosed aspect of the embodiments relates to a liquid discharge apparatus.

Description of the Related Art

Conventional liquid discharge apparatuses are known to include ink tanks for storing ink to be supplied to a liquid discharge head for discharging ink. Some of such liquid discharge apparatuses allow a user to replenish ink by injecting ink into each ink tank. The user injects ink into the ink tank through an injection port provided on the ink tank. The injection port is configured to be openable or closable when a plug member is detached or attached, respectively. Japanese Patent Application Laid-Open No. 2018-69705 discusses a configuration in which an elastically deformable plug member for plugging an injection port is attached to a highly rigid retaining member that is rotated to open or close the injection port.

However, in the configuration discussed in Japanese Patent Application Laid-Open No. 2018-69705, the positional relation between the plug member and the injection port may be shifted by the rotation of the retaining member. Attaching the plug member to the injection port in a shifted positional state may possibly cause insufficient closing of the injection port.

SUMMARY

One aspect of the embodiments has been devised in view of the above-described issue and is directed to more securely closing an injection port provided on a liquid container.

According to an aspect of the embodiments, a liquid discharge apparatus includes a liquid container and an operating member. The liquid container is configured to introduce liquid from a liquid introducing portion to an inside. The operating member is configured to rotate around a rotation shaft in a first direction from a first position for covering the liquid introducing portion to move to a second position for exposing the liquid introducing portion, and rotate in a second direction opposite to the first direction from the second position to move to the first position. The operating member includes a plug member and a covering portion. The plug member is retained to the operating member by a retaining member and is configured to plug the liquid introducing portion at the first position. The covering portion is configured to cover the plug member in a direction intersecting with the first direction.

Further features of the disclosure will become apparent from the following description of exemplary embodiments with reference to the attached drawings.

DESCRIPTION OF THE EMBODIMENTS

First Embodiment

Figure 1:
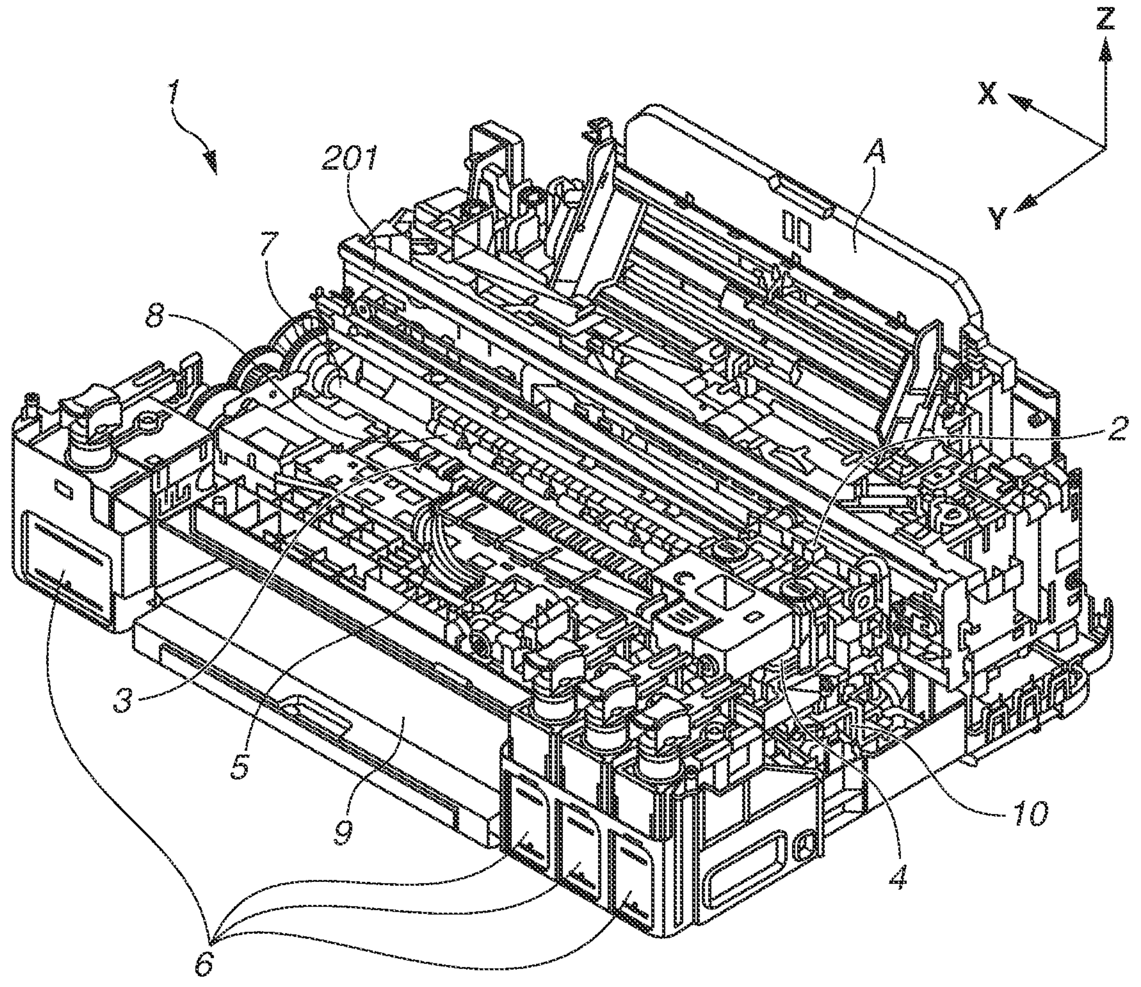
FIG. 1 is a schematic view illustrating an overview of a liquid discharge apparatus according to a first exemplary embodiment.

An overview of an ink jet recording apparatus as an example of a liquid discharge apparatus according to the disclosure will now be described. FIG. 1 is a schematic view illustrating an ink jet recording apparatus according to the first embodiment.

An ink jet recording apparatus 1 (hereinafter referred to as a recording apparatus 1) includes a feed roller (not illustrated) that feeds each of recording media stacked on a paper feed tray A. A fed recording medium is sent to between a conveyance roller 7 and a pinch roller 8 and then conveyed in the +Y direction in FIG. 1. The rear surface of the conveyed recording medium is supported by a platen 3. The recording medium is retained such that the distance between the nozzles (not illustrated) of a recording head 4 as a liquid discharge head and the recording medium as a medium subjected to liquid discharge is maintained to be a constant or predetermined distance. In this state, the nozzles of the recording head 4 discharge ink (a liquid containing a coloring material) to the recording medium to perform recording on the recording medium.

The recording head 4 having the nozzles for discharging ink (liquid) is mounted on a carriage 2 that is reciprocated along a carriage rail 201 in the X direction by a driving unit or device, such as a motor. The recording head 4 discharges ink drops while moving in the main scanning direction, together with the carriage 2, to record an image for one band on the recording medium on the platen 3. When an image for one band has been recorded, the recording medium is conveyed by a predetermined amount in the conveyance direction by a conveyance roller 7 (intermittent conveyance operation). Repeating the recording operation for one band and the intermittent conveyance operation records an image on the recording medium based on image data. The recording medium having been subjected to recording by the recording head 4 is sent to between a discharge roller (not illustrated) and a driven roller and then is discharged onto a discharge tray 9.

The recording apparatus 1 is provided with ink tanks 6 as a plurality of independent liquid containers corresponding to different ink colors to be discharged from the recording head 4. The ink tanks 6 and the recording head 4 are connected by tubes 5 (see FIGS. 3A and 3B) corresponding to different ink colors via joints (not illustrated). This configuration enables supplying ink of different colors stored in the ink tanks 6 to the nozzles of the recording head 4 corresponding to the different ink colors.

The recording apparatus 1 includes a cap member 10 for covering a surface where the nozzles of the recording head 4 are formed. The cap member 10 is made of a flexible material and configured to be movable to a capping position for covering an ink discharge portion 81 of the recording head 4 and to a separated position not for covering the ink discharge portion 81. The cap member 10 is connected to a pump (not illustrated). When the pump is driven in a state where the cap member 10 is positioned at the capping position, the internal pressure of the cap member 10 becomes negative and hence ink is absorbed from the recording head 4. This sequence recovers the ink discharge performance of the recording head 4. The cap member 10 also has a role of preventing ink discharge failures due to the dried nozzles for the following reason. The cap member 10 is positioned at the capping position in a standby state where the recording head 4 is not performing the reading operation. This reduces the time during which the nozzles of the recording head 4 are exposed in the atmosphere.

Figure 2:
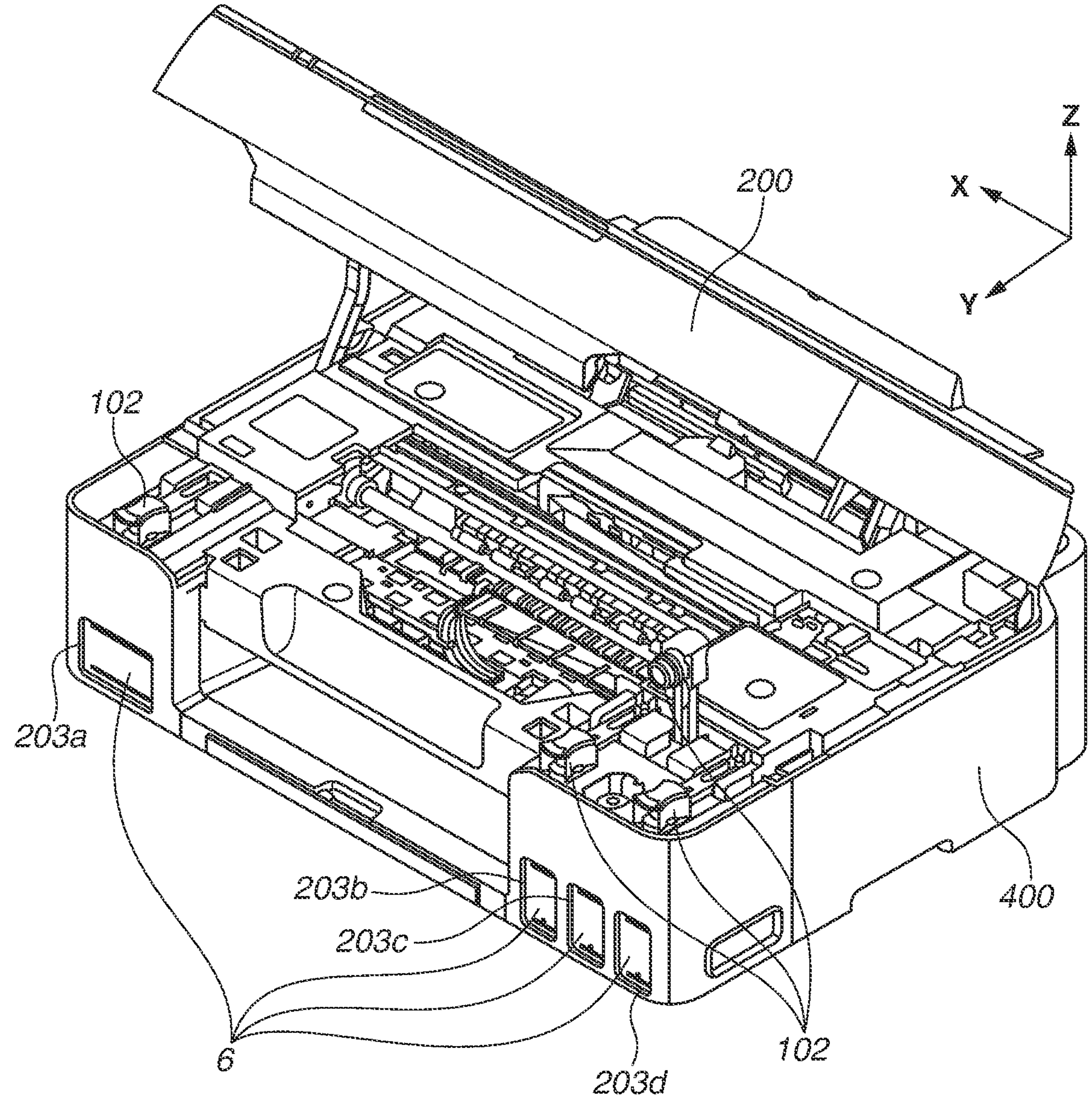
FIG. 2 illustrates a configuration including a housing of the liquid discharge apparatus according to the first exemplary embodiment.

The recording apparatus 1 is covered by a housing 400, as illustrated in FIG. 2. The housing 400 is provided with opening windows 203*a*, 203*b*, 203*c*, and 203*d* corresponding to the different arrangement positions of the ink tanks 6, allowing the user to visually recognize the ink tanks 6 from the front side through the opening windows. This configuration allows the user to visually check the remaining amounts of ink stored in the ink tanks 6. With each of the ink tanks 6 according to the present exemplary embodiment, ink can be injected (introduced) from an injection port 21 (see FIG. 3A) as a liquid introducing portion that is plugged by a plug member 102. The plug member 102 is configured to be movable to the closing position for plugging the injection port 21 or the opening position for opening the injection port 21. The ink tanks 6 and the recording head 4 are connected by the tubes 5 as paths for supplying ink from the ink tanks 6 to the recording head 4.

The recording apparatus 1 is provided with a cover 200 that is configured to be rotatable between the closing position for covering the interior of the apparatus 1 and the opening position for opening the interior of the apparatus 1. When the user injects ink into an ink tank 6, the user moves the cover 200 and the plug member 102 to the opening positions and then injects ink in a state where the injection port 21 is open.

Figure 3A:
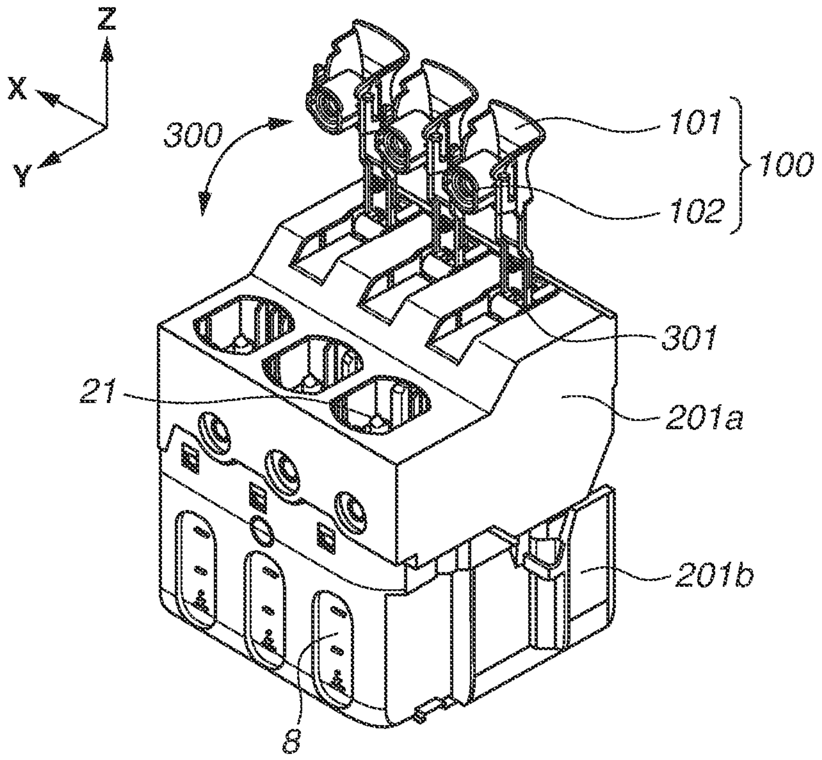
FIGS. 3A and 3B are schematic views illustrating a liquid storage unit or device according to the first exemplary embodiment.
Figure 3B:
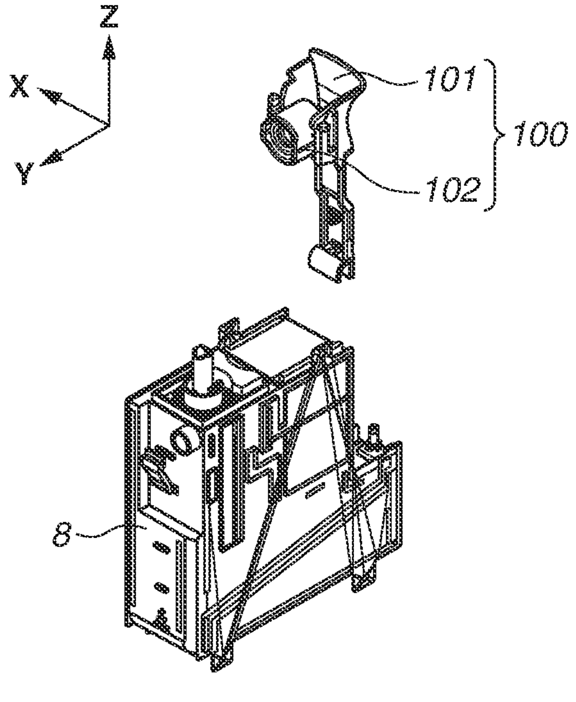

FIGS. 3A and 3B are schematic views illustrating a liquid storage unit or device. As illustrated in FIG. 3A, the ink tanks 6 are positioned by a housing 201*b*. Operating members 100 are attached to a rotation shaft 301 provided in a housing 201*a* that is positioned by the housing 201*b*, so that the operating members 100 are rotatable in a direction 300 around the rotation shaft 301. Thus, the ink tanks 6 are integrally retained by the housings 201*a* and 201*b*. According to the present exemplary embodiment, the rotation shaft 301 is disposed in the X direction, and the direction 300 intersects with the axial direction of the rotation shaft 301. According to the present exemplary embodiment, the ink tanks 6 and the operating members 100 are collectively referred to as a liquid storage unit.

FIG. 3B illustrates an ink tank 6 and an operating member 100 in a state where the housings 201*a* and 201*b* are removed from the state in FIG. 3A. According to the present exemplary embodiment, one operating member 100 is provided for each ink tank 6. Each operating member 100 is formed of a plug member 102 and a retaining member 101.

Figure 4:
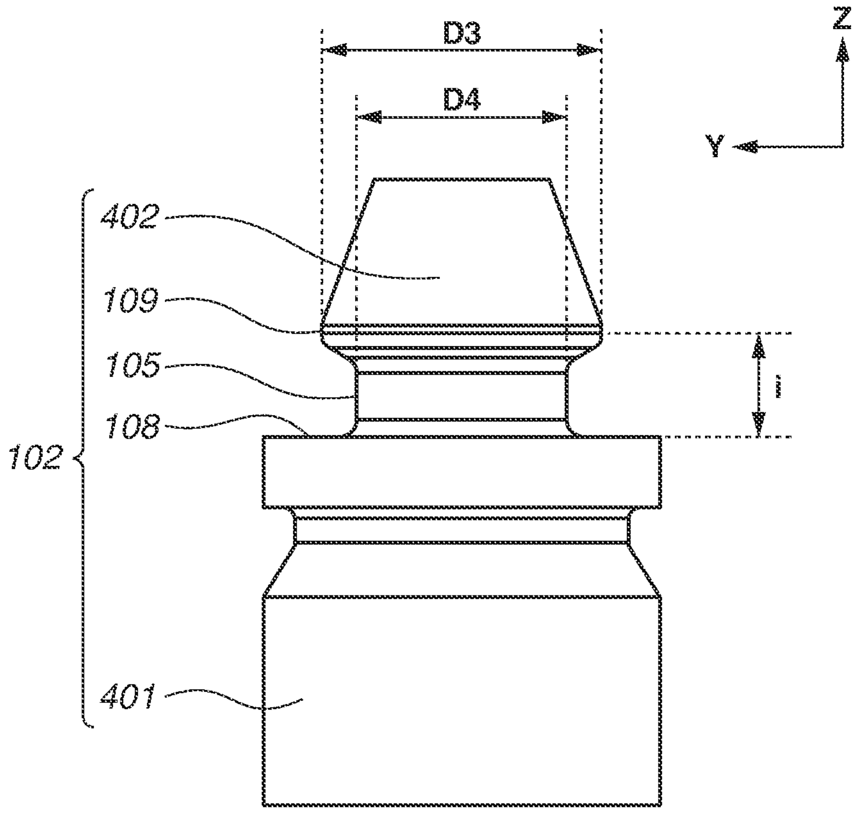
FIG. 4 is a schematic view illustrating a plug member according to the first exemplary embodiment.

The structure of the operating member 100 will now be described with reference to FIGS. 4, 5A, and 5B. As described above, the operating member 100 is formed of a plug member 102 and a retaining member 101. The plug member 102 is supported by the retaining member 101 and integrally moves with the operating member 100. The plug member 102 is formed of a closing portion 401, an engaging portion 105, and a retaining portion 402 as illustrated in FIG. 4. The engaging portion 105 is a recessed portion ranges from an upper portion 108 of an injection port retaining portion to an expanding portion 109 of the retaining portion 402, and has a length i and a length of a width D4. The expanding portion of the retaining portion 402 has a length of a width D3.

Figure 5A:
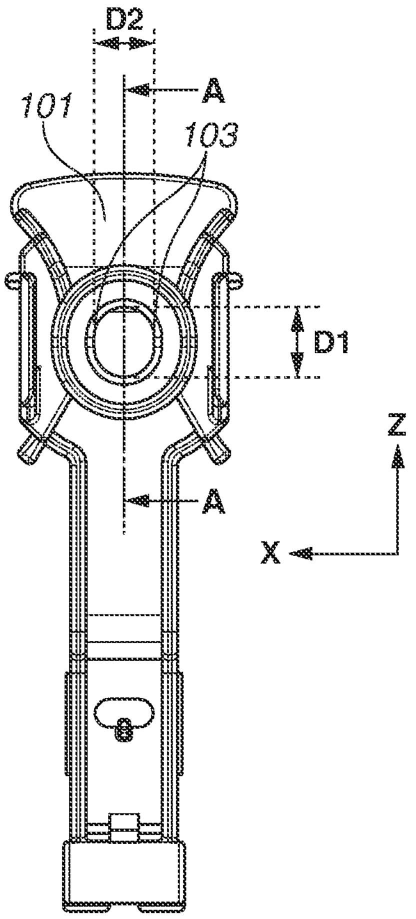
FIGS. 5A and 5B are schematic views illustrating a retaining member and the plug member, respectively, configuring an operating member according to the first exemplary embodiment.

As illustrated in FIG. 5A, the retaining member 101 in a state where the plug member 102 is not retained includes an engaging portion (opening portion) 103 having an oblong hole shape where the length of a longitudinal width D1 of the retaining member 101 is larger than the length of a lateral width D2 of the retaining member 101. When the plug member 102 is attached to the retaining member 101 such that the engaging portion 105 of the plug member 102 engages with the engaging portion 103 of the retaining member 101, the retention of the plug member 102 by the retaining member 101 is completed, as illustrated in FIG. 5B. According to the present exemplary embodiment, the retaining portion 402 has a shape expanding from the upper portion to the expanding portion 109, where the length of an outer diameter D3 of the expanding portion 109 is larger than the length of the width D2 of the engaging portion 103. When the plug member 102 is attached to the retaining member 101, the upper portion of the retaining portion 402 is inserted into the engaging portion 103 all the way to the engaging portion 105. Thus, the engaging portion 103 engages with the engaging portion 105. The length of the width D4 of the engaging portion 105 is set to be smaller than the lengths of the widths D1 and D2. When the plug member 102 engages with the retaining portion 402, as described below, the plug member 102 is retained by the retaining member 101.

As described above, the outer diameter of the expanding portion 109 of the retaining portion 402 is larger than the length of the width D2 of the engaging portion 103 in the X direction. The plug member 102 is made of an elastically deformable material, and the retaining member 101 is made of a material having a higher rigidity than the material of the plug member 102. Thus, when the retaining portion 402 is inserted into the engaging portion 103, the retaining portion 402 is elastically deformed along the engaging portion 103.

Thus, whole of the retaining portion 402 can be inserted into the engaging portion 103. In this case, the engaging portion 103 has an oblong hole shape with the longitudinal width D1 as the larger width and the lateral width D2 as the smaller width.

In a state where the retaining portion 402 has been inserted into the engaging portion 103, and the engaging portion 103 engages with the engaging portion 105, the expanding portion 109 of the retaining portion 402 having been elastically deformed returns to the original shape, preventing the retaining portion 402 from coming off from the engaging portion 103. This maintains the engagement between the engaging portions 103 and 105. As described above, the retaining portion 402 has a shape expanding from the upper portion to the expanding portion 109. Thus, the retaining portion 402 can be smoothly inserted into the engaging portion 103 if the length of the outer diameter of the upper portion of the retaining portion 402 is formed to be smaller than the length of the width D2 of the engaging portion 103. The retaining portion 402 does not necessarily need to be shaped to expand from the upper portion to the expanding portion 109. For example, the retaining portion 402 can be shaped in step or wave form as long as the plug member 102 can be retained by the retaining member 101.

Figure 5B:
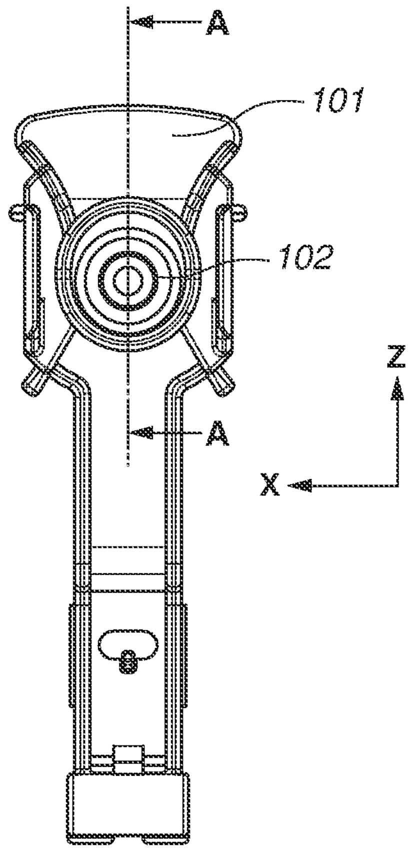
Figure 6A:
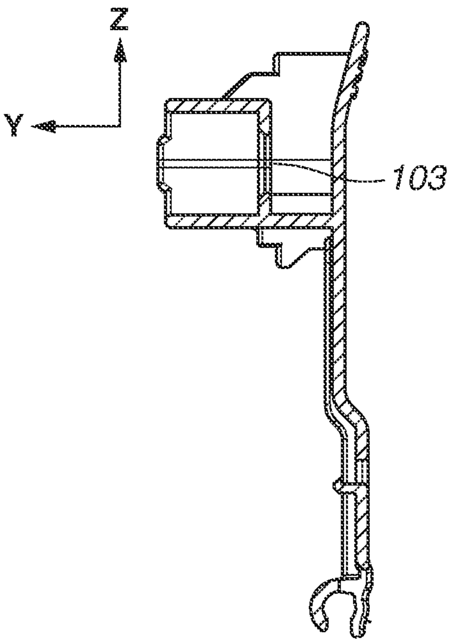
FIGS. 6A to 6C are cross-sectional views illustrating the retaining member and the plug member taken along the A-A lines in FIGS. 5A and 5B in a state where the operating member is positioned at an opening position according to the first exemplary embodiment.
Figure 6B:
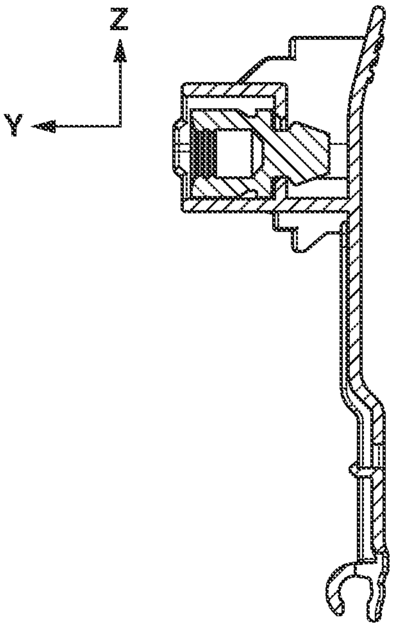
Figure 6C:
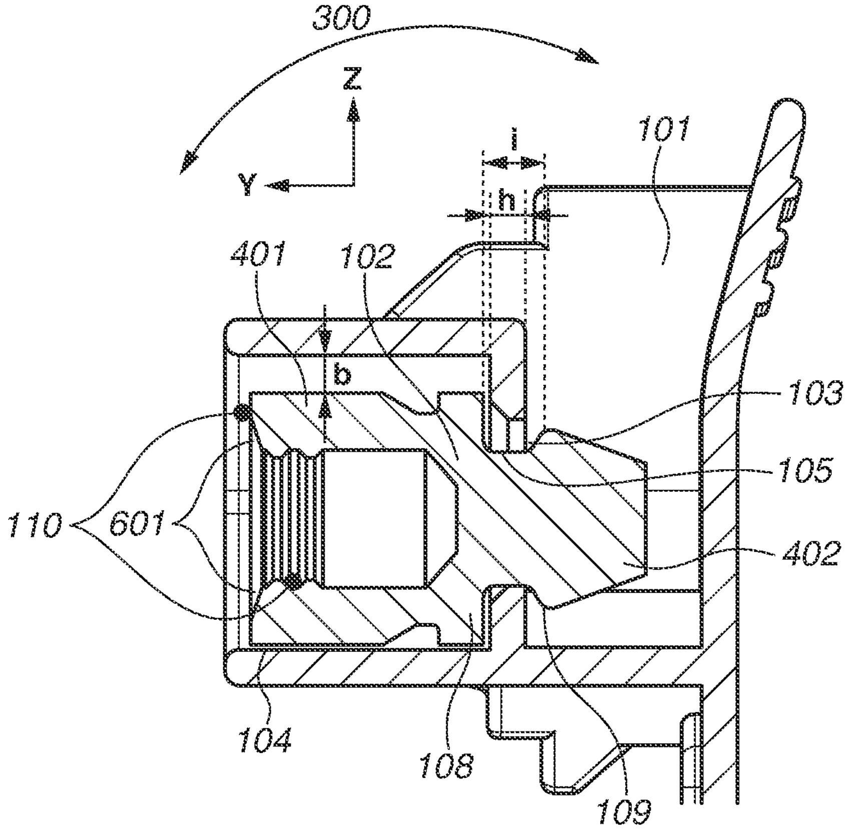

FIGS. 6A to 6C are cross-sectional views illustrating the retaining member 101 and the plug member 102 taken along the A-A line in FIGS. 5A and 5B in a state where the operating member 100 is positioned at the opening position. FIG. 6A is a cross-sectional view illustrating only the retaining member 101. FIG. 6B is a cross-sectional view illustrating a state where the plug member 102 is attached to the retaining member 101. FIG. 6C is an enlarged view illustrating the periphery of the plug member 102 illustrated in FIG. 6B. As illustrated in FIG. 6C, the length of a width h of the engaging portion 103 in the direction 300 is set to be smaller than the length i of the engaging portion 105. The plug member 102 attached to the retaining member 101 is therefore loosely fitted in the direction 300. As described above, the width D4 of the engaging portion 105 of the plug member 102 is set to be smaller than the widths D1 and D2 of the engaging portion 103. The plug member 102 is therefore configured to loosely fit the retaining member 101 to be movable in any of the X, Y, and Z directions (see FIG. 6C). This also applies to the changed orientation of the operating member 100. The dimensions of the engaging portions 103 and 105 may be set according to the amount of loose fitting to be prepared in the engagement between the engaging portions 103 and 105. However, the range where the plug member 102 is movable through the loose fitting of the engaging portion 103 is within the range regulated by the retaining portion 402, the upper portion 108 of the closing portion 401, and a covering portion 104 (described below). Referring to FIG. 6C, one side of the inner wall of the covering portion 104 (−Z direction side in a FIG. 6C) is in contact with the lower side of the plug member 102. The other side of the inner wall of the covering portion 104 (+Z direction side in FIG. 6C) is not in contact with the upper portion of the plug member 102, and there is a gap b between the inner wall and the upper portion. The length of the gap b needs to be suitably determined in consideration of the dimensions of the operating member 100 and the movable range of the loosely fitted plug member 102, and can be, for example, about 1.0 to 3.0 mm.

Figure 8A:
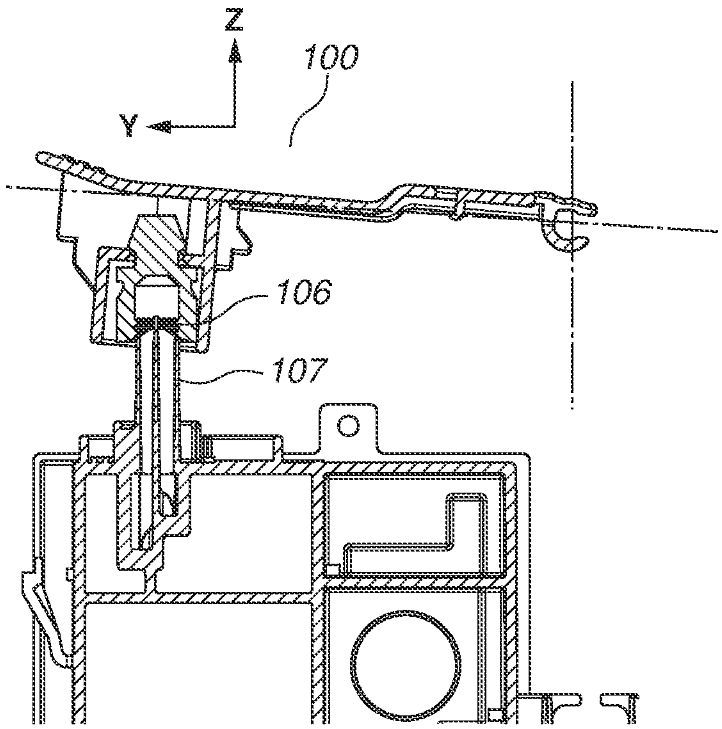
FIGS. 8A and 8B are cross-sectional views illustrating the liquid storage unit according to the first exemplary embodiment.

The loose fitting between the engaging portion 105 and the engaging portion 103 enables the plug member 102 to be movable in association with the rotation of the retaining member 101 or the insertion into an injection port 21. A leading edge 601 of the closing portion 401 is shaped such that the opening gradually decreases toward the center of the plug member 102, i.e., toward the depth side of the plug member 102 (−Y direction). Thus, when the injection port 21 comes into contact with the leading edge 601 of the closing portion 401, as illustrated in FIG. 8A, the injection port 21 is guided to the center of the closing portion 401, and the closing is smoothly accomplished.

The retaining member 101 is longer than the plug member 102 in the direction 300, and is provided with a covering portion 104 that covers the closing portion 401 of the plug member 102 when the plug member 102 is retained by the retaining member 101. When the injection port 21 is closed, ink 110 transferred from the injection port 21 may adhere to the leading edge or the inside of the closing portion 401 of the plug member 102. If the user touches the leading edge or the inside of the closing portion 401 in a state where the operating member 100 is positioned at the opening position, the ink 110 may possibly adhere to the user.

According to the present exemplary embodiment, the leading edge of the covering portion 104 protrudes in the direction 300 more than the leading edge of the closing portion 401. This allows the user to touch the covering portion 104 before touching the leading edge of the closing portion 401, preventing ink adhesion to the user's hand.

Figure 7A:
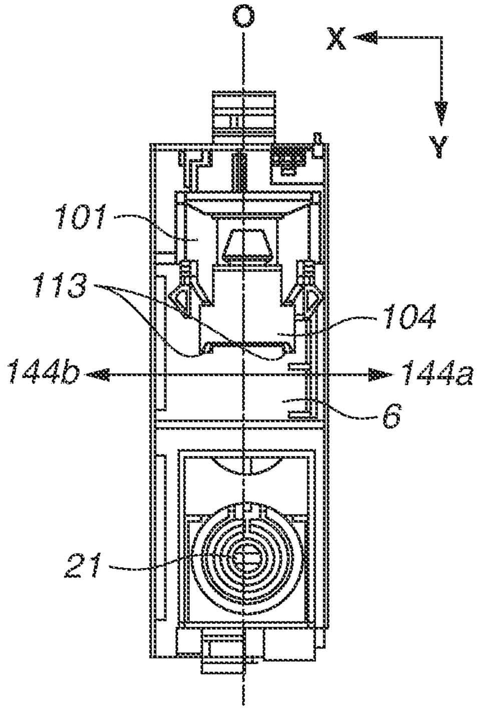
FIGS. 7A and 7B are top views and FIG. 7C is a lateral view illustrating the liquid storage unit according to the first exemplary embodiment.
Figure 7B:
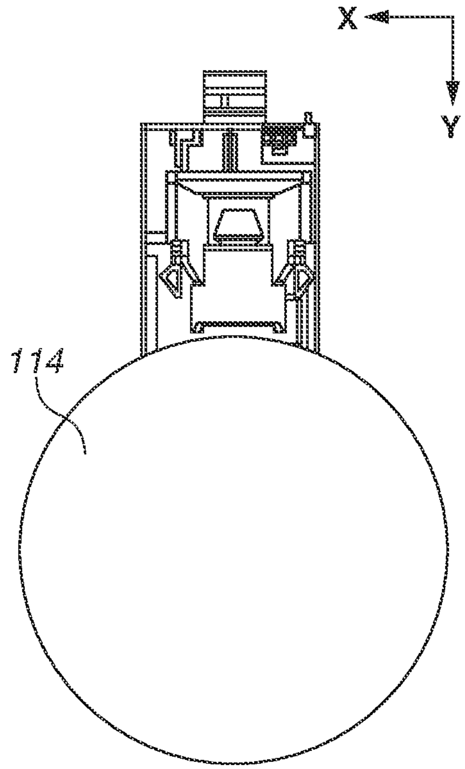
Figure 7C:
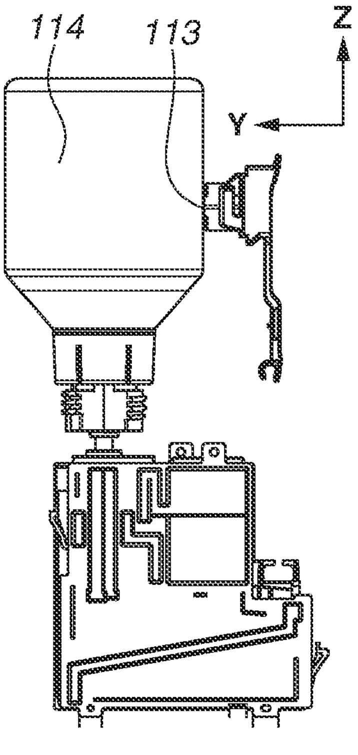

FIGS. 7A and 7B are top views illustrating the liquid storage unit according to the present exemplary embodiment. FIG. 7A illustrates a state where the operating member 100 is rotated to open the plug member 102, viewed from above in the Z direction. FIG. 7B illustrates a state where the injection port 21 of the ink tank 6 is inserted into an ink bottle 114 in the state in FIG. 7A, viewed from above in the Z direction. FIG. 7C illustrates the state in FIG. 7B, viewed from the X direction. The amount of opening of the operating member 100 with respect to the ink tank 6 needs to be suitably determined in consideration of the dimension or weight of the operating member 100. According to the present exemplary embodiment, for example, the amount of opening is set to about 90 to 100 degrees. Even when the cover 200 is moved to the closing position in a state where the operating member 100 is positioned at the opening position, the operating member 100 is pushed by the cover 200 and accordingly moved from the opening position to the closing position.

When ink is replenished into the ink tank 6, the injection port 21 is inserted into the ink bottle 114 in the Z direction to inject ink from the ink bottle 114 into the ink tank 6. The amount of opening of the operating member 100 is set to about 90 degrees. Thus, when the injection port 21 is inserted into the ink bottle 114, the outer surface of the ink bottle 114 and the covering portion 104 interfere with each other, and the ink bottle 114 may possibly come into contact with the covering portion 104. As described above, since the leading edge of the covering portion 104 more outwardly protrudes than the closing portion 401 of the plug member 102, ink adhering to the leading edge of the closing portion 401 is prevented from adhering to the ink bottle 114. However, if ink adheres to the leading edge of the covering portion 104, ink on the covering portion 104 adheres to the ink bottle 114, and possibly adheres to the user replenishing ink.

The leading edge of the covering portion 104 is therefore provided with a pair of protruding portions 113 at positions farthest in the X direction from the extension line along the center O of the injection port 21 in the Y direction.

According to the present exemplary embodiment, the ink bottle 114 has a cylindrical shape. Thus, when the injection port 21 is inserted into the ink bottle 114, the ink bottle 114 and the covering portion 104 come close to each other at the position on the extension line along the center O of the injection port 21 in the Y direction. Thus, providing the protruding portions 113 as described above allows the covering portion 104 to be kept away from the ink bottle 114 even if the ink bottle 114 comes into contact with the protruding portions 113. Thus, even if the ink bottle 114 comes into contact with the leading edge of the covering portion 104, the ink bottle 114 can avoid the contact with portions at the leading edge of the covering portion 104 where the protruding portions 113 are not provided.

Instead of being provided with the protruding portions 113, the leading edge of the covering portion 104 may be provided with an arc shape protruding at positions farthest in the X direction from the extension line along the center O of the injection port 21 in the Y direction.

Figure 8B:
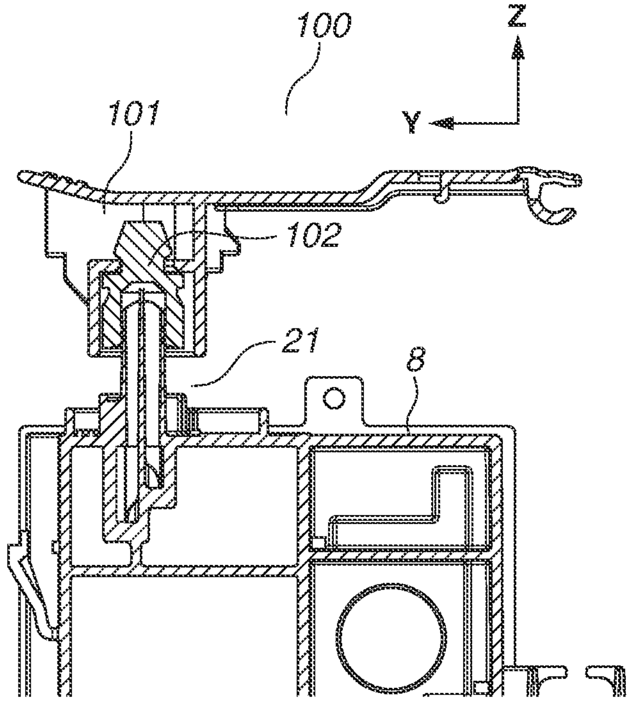

FIGS. 8A and 8B are Y-Z cross-sectional views illustrating the liquid storage unit. FIG. 8A illustrates a state where the plug member 102 and the injection port 21 start coming into contact with each other during the closing motion for the injection port 21 by the operating member 100.

FIG. 8B illustrates a state where the injection port 21 has been closed by the operating member 100. The closing portion 401 of the plug member 102 is provided inside with protruding portions 106. The inner diameter of the protruding portions 106 is slightly smaller than the outer diameter of an injection port engaging portion 107 of the injection port 21. Thus, when the protruding portions 106 and the injection port 21 engage with each other during the closing motion for the injection port 21 by the operating member 100, the protruding portions 106 elastically deform to fit the outer diameter of the injection port 21. This structure enables more securely closing the injection port 21.

During the closing motion for the injection port 21 by the operating member 100, the plug member 102 attached to the retaining member 101 rotates in the direction 300 following the rotation of the operating member 100 from the opening position to the closing position. According to the present exemplary embodiment, in the period during which the plug member 102 starts coming into contact with the injection port 21 until the injection port 21 is closed, the plug member 102 performs the closing motion by engaging with the injection port 21 in the approximate Z direction. During the closing motion, the position of the engaging portion 105 of the plug member 102 in the engaging portion 103 moves following the closing motion for the injection port 21. In particular, the plug member 102 moves in the Y direction (FIG. 8B) following the rotation in the direction 300.

In this state, the plug member 102 is retained by the retaining member 101 in a state of loosely fitting in all directions (X, Y, and Z directions), as described above. The engaging portion 103 has an oblong hole shape with the larger width D1 in the longitudinal direction of the retaining member 101 (Y direction in FIGS. 8A and 8B). Thus, the retaining member 101 keeps retaining the plug member 102 while allowing the movement of the plug member 102 in the Y direction.

If a shift occurs in the contact between the injection port 21 and the plug member 102 during the closing motion by the operating member 100, the plug member 102 moves along the engaging portion 103 so as to guide the injection port 21 toward the center of the plug member 102, thus absorbing the positional shift.

With this configuration, the loose-fitting of the plug member 102 absorbs the positional shift of the plug member 102 with respect to the injection port 21 during the closing motion for the injection port 21 by the operating member 100. This structure enables more securely closing the injection port 21. Although, according to the present exemplary embodiment, the operating member 100 rotates around the rotation shaft 301, the operating member 100 can plug the injection port 21 through a sliding motion. Although, according to the present exemplary embodiment, the engaging portion 103 has an oblong hole shape, the engaging portion 103 can have a horizontally oblong hole shape, a round hole shape, or other shapes depending on the direction or type of the motion of the operating member 100.

Second Embodiment

A second embodiment will now be described. For configurations similar to those according the first embodiment, redundant descriptions will be omitted.

Figure 9A:
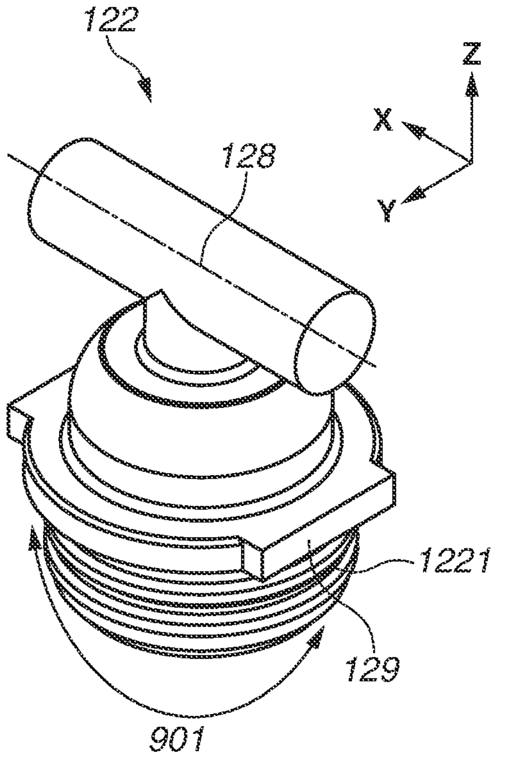
FIGS. 9A and 9B are schematic views illustrating a plug member according to a second exemplary embodiment.
Figure 9B:
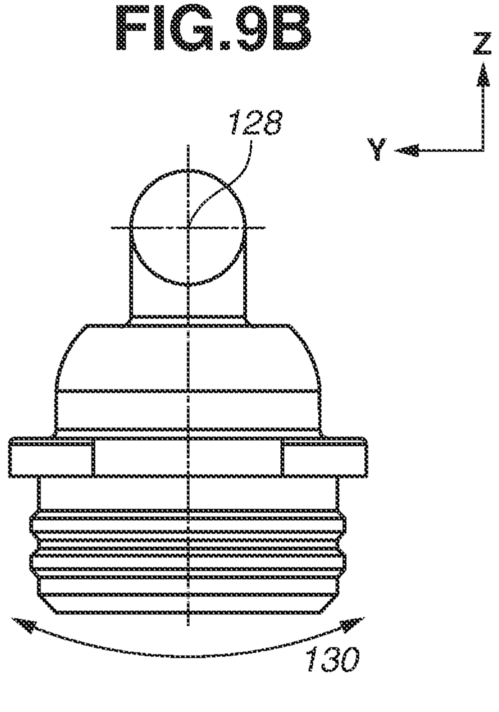

FIGS. 9A and 9B are schematic views illustrating a plug member according to the present exemplary embodiment. FIG. 9A is a perspective view illustrating the outer appearance of a plug member 122. FIG. 9B illustrates the plug member 122, viewed from the X direction in FIG. 9A. The plug member 122 is provided with a plug member rotation axis 128 and plug member regulating portions 129. In a state where the plug member 122 is retained by a retaining member 121 (described below), the plug member 122 is engaged with the retaining member 121 by the plug member rotation axis 128. In a state where the plug member 122 is retained by the retaining member 121, the plug member 122 is rotatable in a direction 130 around the plug member rotation axis 128.

Figure 10A:
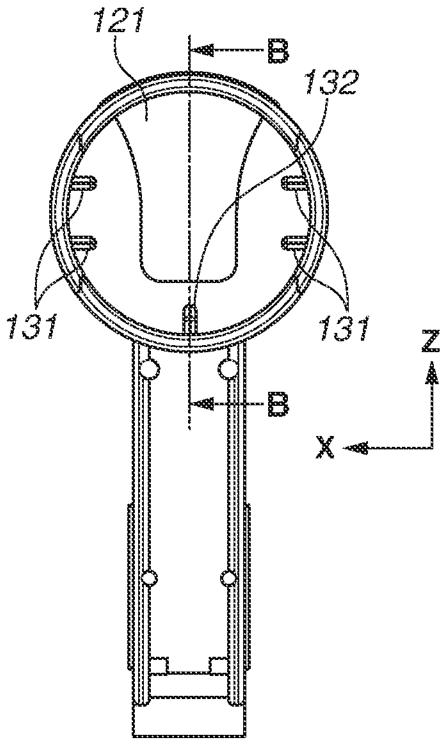
FIGS. 10A to 10C are schematic views illustrating a retaining member and a plug member configuring the operating member according to the second exemplary embodiment.
Figure 10B:
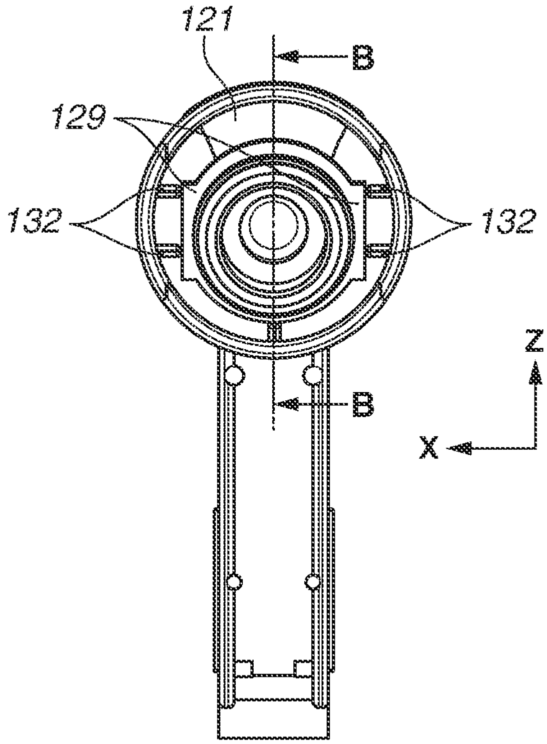
Figure 10C:
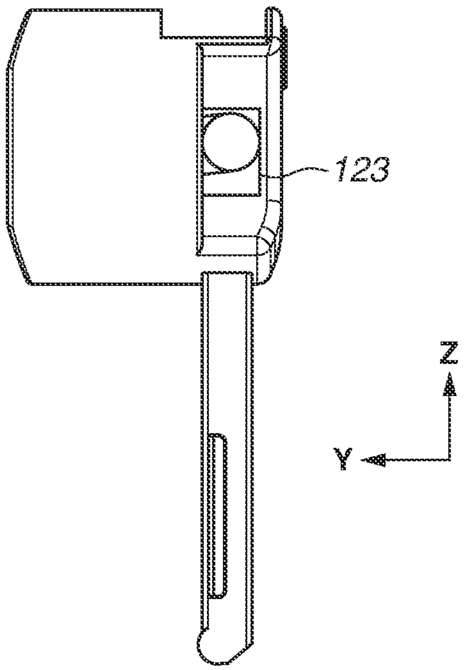

FIGS. 10A to 10C are schematic views illustrating the retaining member 121 and the plug member 122 configuring an operating member. FIG. 10A is a schematic view illustrating the retaining member 121. FIG. 10B illustrates a state where the plug member 122 is retained by the retaining member 121. The retaining member 121 is provided with plug member regulation ribs 131. When the plug member 122 is retained by the retaining member 121 as illustrated in FIG. 10B, the upper surfaces of plug member regulating portions 129 of the plug member 122 come into contact with the plug member regulation ribs 131. This structure regulates the rotation of the plug member 122 in a direction 901 (see FIG. 9A) perpendicularly intersecting with the direction 130.

FIG. 10C is a Y-Z cross-sectional view illustrating the operating member. In a state where the plug member 122 is retained by the retaining member 121, the plug member rotation axis 128 is attached in a shaft attachment portion 123 provided on the retaining member 121. The plug member rotation axis 128 loosely fits the shaft attachment portion 123 and is rotatable in the direction 130 as the rotational direction of the plug member 122.

Figure 11A:
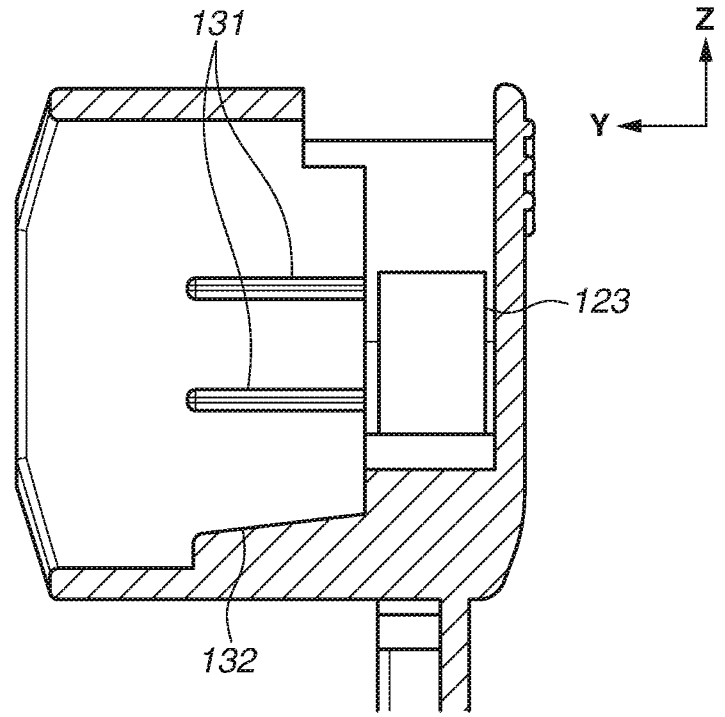
FIGS. 11A and 11B are cross-sectional views illustrating the retaining member and the plug member configuring the operating member according to the second exemplary embodiment.
Figure 11B:
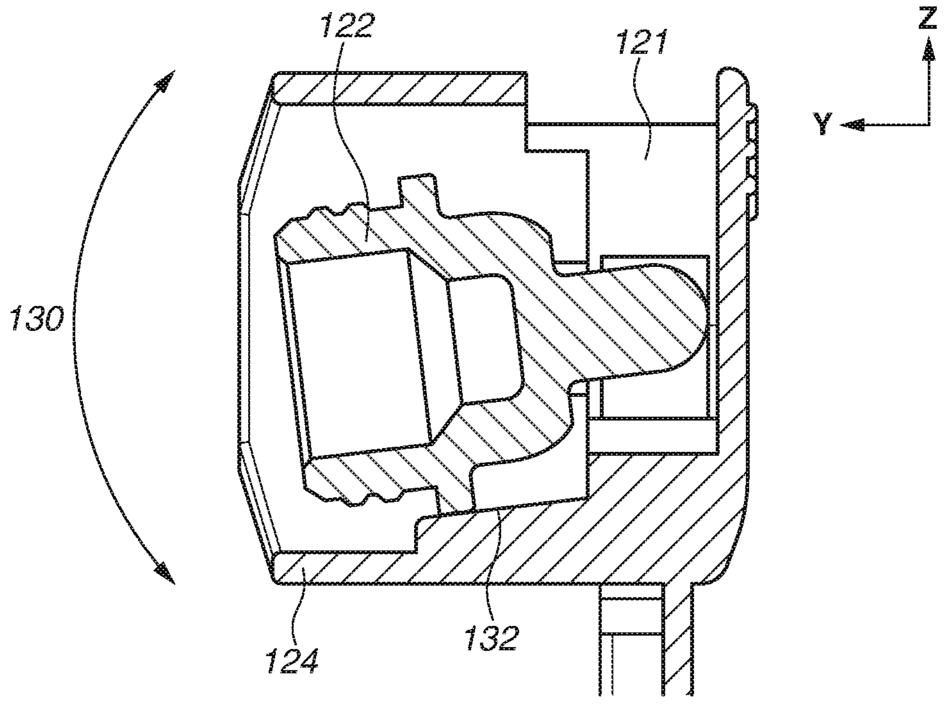

FIGS. 11A and 11B are cross-section views illustrating the retaining member 121 and the plug member 122, respectively, configuring the operating member. FIG. 11A is a partial cross-sectional view taken along the B-B line illustrated in FIG. 10A. FIG. 11B is a partial cross-sectional view taken along the B-B line illustrated in FIG. 10B. The retaining member 121 is provided with a covering portion 124 that covers the periphery of the plug member 122. The covering portion 124 is provided inside with a rotation regulating portion 132 that regulates the rotation of the plug member 122 in the direction 130 not to exceed a predetermined amount. When the plug member 122 rotates in the direction 130 inside the covering portion 124, the side surface of the plug member 122 comes into contact with the rotation regulating portion 132 to regulate the rotation of the plug member 122.

Figure 12A:
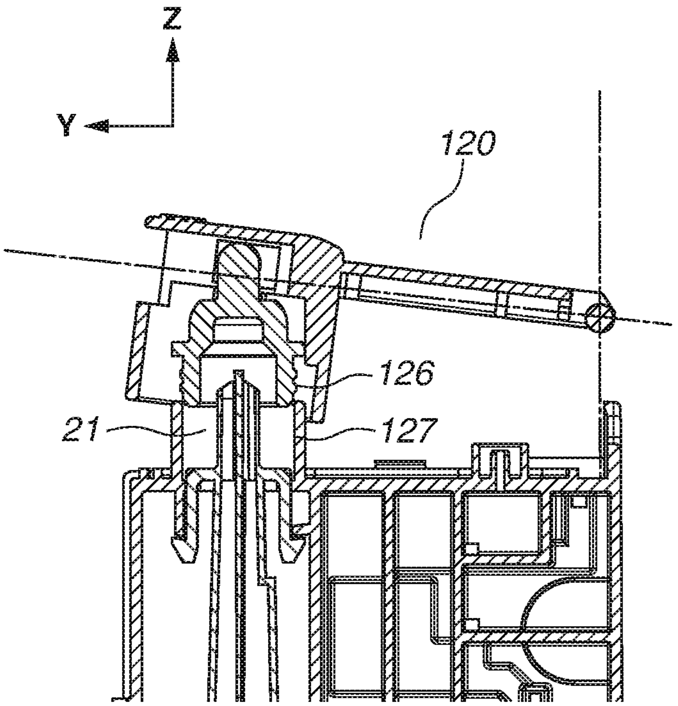
FIGS. 12A and 12B are cross-sectional views illustrating a liquid storage unit according to the second exemplary embodiment.
Figure 12B:
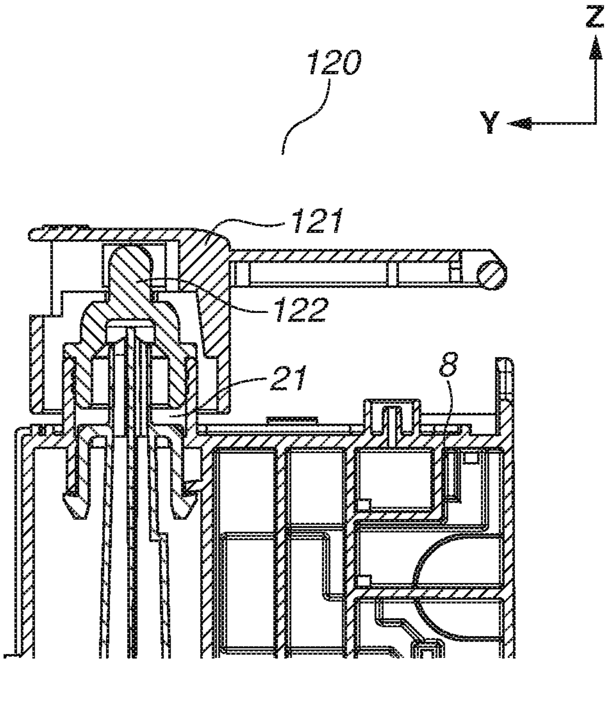

FIGS. 12A and 12B are cross-sectional views illustrating the liquid storage unit. FIG. 12A illustrates a state where the plug member 122 and the injection port 21 start coming into contact with each other during the closing motion for the injection port 21 by an operating member 120.

FIG. 12B illustrates a state where the injection port 21 has been closed by the operating member 120. According to the present exemplary embodiment, the outer surface of a closing portion 1221 of the plug member 122 is provided with a protruding portion 126. A plug member engaging portion 127 is provided around the injection port 21. When the operating member 120 moves from the opening position to the closing position, the plug member 122 rotates inside the covering portion 124 following the motion of the operating member 120. However, since the inside the covering portion 124 is provided with the rotation regulating portion 132, as described above, the plug member 122 does not rotate any more than in the state when the plug member 122 comes into contact with the rotation regulating portion 132. As illustrated in FIG. 12A, the closing portion 1221 of the plug member 122 and the injection port 21 start coming into contact with each other in a state where the center of the plug member 122 and the center of the injection port 21 exist approximately on the same axis.

When the operating member 120 is further rotated to the closing position from the state in FIG. 12A, the motion of the plug member 122 is guided by the plug member engaging portion 127. Thus, the plug member 122 and the rotation regulating portion 132 do not come into contact with each other inside the covering portion 124. This enables the plug member 102 to move along the attachment portion 123. Thus, the plug member 122 can suitably perform the closing motion to the injection port 21 even if the position of the operating member 120 shifts with respect to the injection port 21 during the closing motion. This structure therefore enables securely closing the injection port 21.

Figure 13A:
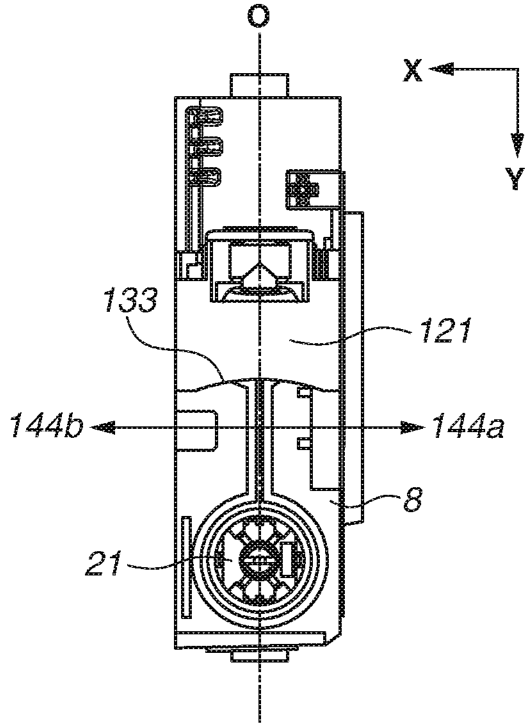
FIGS. 13A and 13B are top views illustrating an ink tank and the operating member according to the second exemplary embodiment.
Figure 13B:
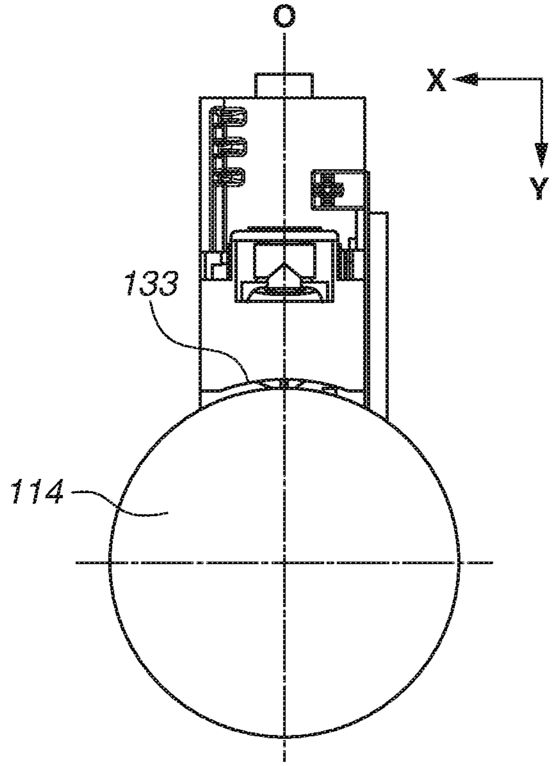
Figure 14A:
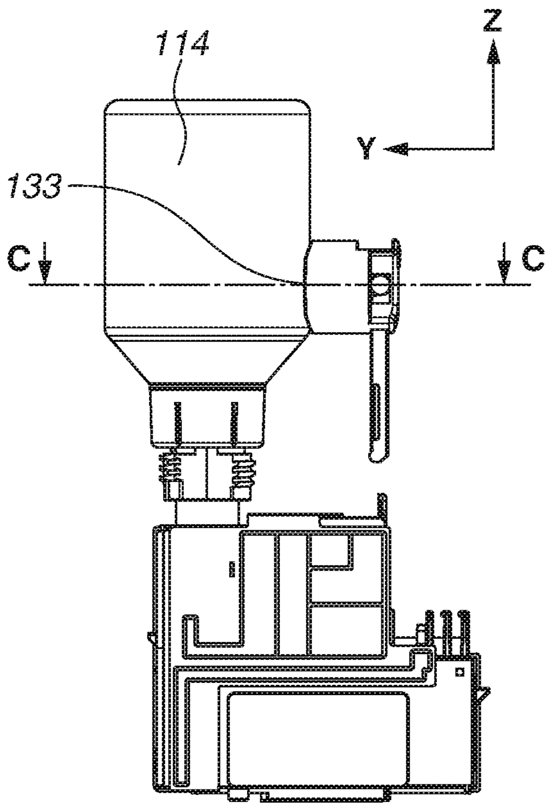
FIGS. 14A and 14B illustrate the ink tank and the operating member according to the second exemplary embodiment.
Figure 14B:
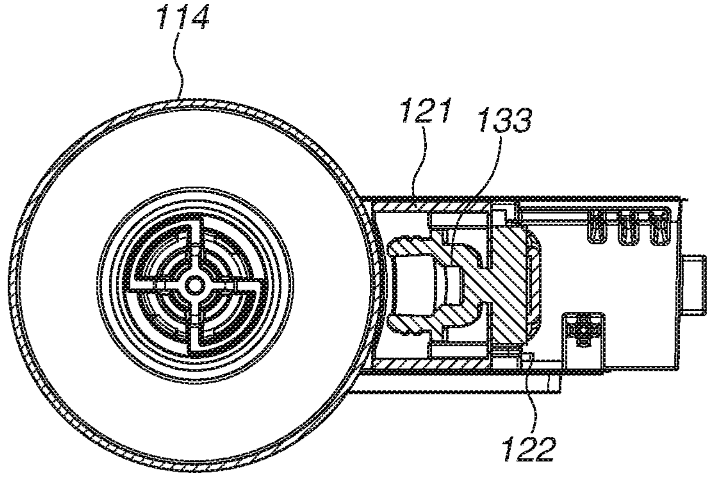

FIGS. 13A and 13B illustrate the ink tank 6 and the operating member 120 according to the present exemplary embodiment. FIG. 13A illustrates a state where the operating member 120 is rotated to open the plug member 122, viewed from above in the Z direction. FIG. 13B illustrates a state where the injection port 21 of the ink tank 6 is inserted into the ink bottle 114 in the state in FIG. 13A, viewed from above in the Z direction. FIG. 14A illustrates the state in FIG. 13B viewed from the X direction. FIG. 14B is a cross-sectional view taken along the C-C line illustrated in FIG. 14A. According to the present exemplary embodiment, the amount of opening of the operating member 120 with respect to the ink tank 6 is set to about 90 degrees. When the injection port 21 is inserted into the ink bottle 114, the outer surface of the ink bottle 114 and the covering portion 104 may possibly interfere with each other. Thus, the ink bottle 114 may possibly come into contact with the covering portion 104.

According to the present exemplary embodiment, a leading edge 133 of the covering portion 124 of the retaining member 121 more outwardly protrudes than the leading edge of the plug member 122. Further, in a state where the operating member 120 is positioned at the opening position as illustrated in FIGS. 13A, 13B, 14A, and 14B, the leading edge 133 of the covering portion 124 has a circular arc shape when viewed from above in the Z direction. More specifically, the leading edge 133 of the covering portion 124 has such a circular arc shape that gradually protrudes along directions 144*a* and 144*b* in the X direction from the extension line along the center O of the injection port 21 in the Y direction. Thus, even in a situation where the outer surface of the ink bottle 114 comes close to the covering portion 124 as illustrated in FIGS. 13B and 14B, the contact between the outer surface of the ink bottle 114 and the covering portion 124 can be prevented. This also prevents the ink bottle 114 from coming into contact with the leading edge of the closing portion 1221 that is more inward than the covering portion 124, preventing ink adhesion to the ink bottle 114.

According to the present exemplary embodiment, the injection port 21 is closed by the protruding portion 126 on the outer surface of the closing portion 1221 of the plug member 122 and the plug member engaging portion 127, the injection port 21 can be closed by a protruding portion provided on the inner side of the closing portion 1221, similarly to the first exemplary embodiment.

According to either exemplary embodiment, no protruding portion can be provided at the closing portion of the plug member. The shape of the leading edge of the covering portion can be flat instead of being partly protruding. Also, in this case, making the entire leading edge of the covering portion more outwardly protrude than the leading edge of the closing portion enables preventing ink adhesion from the closing portion to the user or ink bottle 114.

The above-described configuration makes it possible to absorb the positional shift of the operating member by the loose-fitting of the plug member during the closing movement of the injection port 21. This allows the injection port 21 to be inserted into the plug member with a suitable orientation, thus more securely plugging the injection port 21. In addition, since the closing portion of the plug member is covered by the covering portion, it is possible to prevent the closing portion from coming into contact with the user or the ink bottle 114 and hence prevent ink adhesion thereto even in a state where the operating member is positioned at the opening position.

The above-described configuration makes it possible to more securely close the injection port 21 of the liquid container.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-035638, filed Mar. 8, 2022, which is hereby incorporated by reference herein in its entirety.

What is claimed is:

1. A liquid discharge apparatus comprising:
- a liquid container configured to introduce liquid from a liquid introducing portion to an inside; and
- an operating member, including a retaining member and a covering portion, configured to rotate around a rotation shaft in a first direction from a first position for covering the liquid introducing portion to move to a second position for exposing the liquid introducing portion, and rotate in a second direction opposite to the first direction from the second position to move to the first position; and
- a plug member retained to the operating member by the retaining member which is covered by the covering portion in a direction intersecting with the first direction, and configured to plug the liquid introducing portion at the first position, wherein the plug member includes a first engaging portion configured to engage with a second engaging portion provided on the retaining member, and the first engaging portion and the second engaging portion loosely fit each other in a case where the plug member is retained by the retaining member, and wherein the second engaging portion is an opening of the retaining member, and a length of a width of the opening in a direction intersecting with an axial direction of the rotation shaft is larger than a length of a width of an engaging portion of the plug member.

2. The liquid discharge apparatus according to claim 1, wherein, in a case where the operating member is positioned at the second position, at least a part of an edge of the covering portion in the second direction protrudes in the second direction more than an edge of the plug member in the second direction.

3. The liquid discharge apparatus according to claim 1, wherein the covering portion includes a regulating portion configured to regulate a motion of the plug member in a direction intersecting with the first direction and the second direction.

4. The liquid discharge apparatus according to claim 1, wherein the plug member is made of an elastically deformable member, and the retaining member is made of a material having a higher rigidity than the plug member.

5. The liquid discharge apparatus according to claim 1, wherein the plug member includes a retaining portion configured to maintain an engagement between the first engaging portion and the second engaging portion, and a length of at least a part of an outer diameter of the retaining portion is larger than a length of at least a part of a width of the second engaging portion.

6. The liquid discharge apparatus according to claim 5, wherein the second engaging portion has an oblong hole shape where a length of a width in a direction intersecting with an axial direction of the rotation shaft is larger than a length of a width in the axial direction of the rotation shaft, and a length of at least a part of the width of the retaining portion is larger than the length of the width in the axial direction of the rotation shaft.

7. The liquid discharge apparatus according to claim 1, wherein the plug member includes a closing portion having a protruding portion configure to come into contact with the liquid introducing portion in a state where the liquid introducing portion is closed.

8. The liquid discharge apparatus according to claim 7, wherein an edge portion of the closing portion in the second direction inclines toward the inside of the closing portion.

9. The liquid discharge apparatus according to claim 7, wherein the liquid container includes a plug member engaging portion configured to engage with the closing portion of the plug member positioned at the first position.

10. The liquid discharge apparatus according to claim 1, wherein the liquid container is retained by a housing member, and the rotation shaft is disposed on the housing member.

11. A liquid discharge apparatus comprising:

a liquid container configured to introduce liquid from a liquid introducing portion to an inside; and an operating member, including a retaining member and a covering portion, configured to rotate around a rotation shaft in a first direction from a first position for covering the liquid introducing portion to move to a second position for exposing the liquid introducing portion, and rotate in a second direction opposite to the first direction from the second position to move to the first position; and a plug member retained to the operating member by the retaining member which is covered by the covering portion in a direction intersecting with the first direction, and configured to plug the liquid introducing portion at the first position, wherein the plug member includes a first engaging portion configured to engage with a second engaging portion provided on the retaining member, and the first engaging portion and the second engaging portion loosely fit each other in a case where the plug member is retained by the retaining member, and wherein the plug member includes a retaining portion configured to maintain an engagement between the first engaging portion and the second engaging portion, and a length of at least a part of an outer diameter of the retaining portion is larger than a length of at least a part of a width of the second engaging portion.

* * * * *